UNITED STATES PATENT OFFICE.

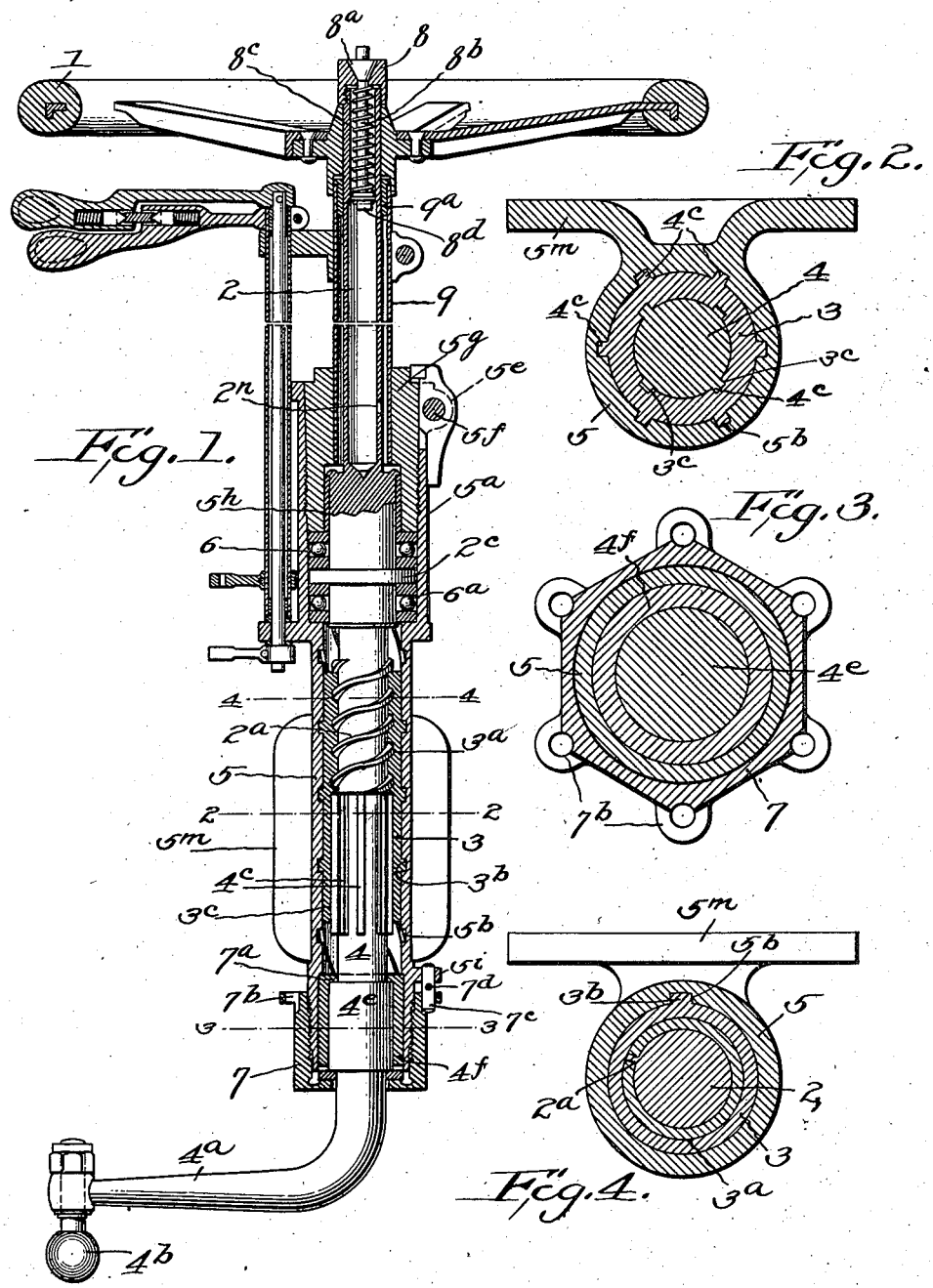

DAVID E. ROSS, OF LA FAYETTE, INDIANA, ASSIGNOR TO ROSS GEAR AND TOOL COMPANY, OF LA FAYETTE, INDIANA, A CORPORATION OF INDIANA.

STEERING-GEAR.

1,185,721.  Specification of Letters Patent.  Patented June 6, 1916.

Application filed February 3, 1912. Serial No. 675,277.

*To all whom it may concern:*

Be it known that I, DAVID E. ROSS, of La Fayette, in the county of Tippecanoe and State of Indiana, have invented certain new and useful Improvements in Steering-Gears; and I hereby declare that the following is a full, clear, and exact description thereof, reference being had to the accompanying drawings, which form part of this specification.

This invention is an improvement in steering gears of the type shown in my Patents, #879,414 of February 18, 1908 and #923,583 of June 1, 1909. Its object is to provide a steering gear especially adapted for use on motor trucks, and fully capable of standing the severe strains to which such devices are subjected when used on commercial vehicles.

The improved steering gear is so constructed that it will resist enormous impact or pressure without breaking; will not develop lost motion; can be readily secured in the machine; and will safely hold the steering wheels in any position to which they are adjusted by the operator under ordinary conditions.

In the preferred form of the invention the steering wheel is keyed to a tubular stem on the lower end of which is a screw that, when turned by the wheel, imparts longitudinal motion to a sleeve which is internally threaded to engage the screw, and also has exterior spiral threads of much greater pitch or lead than the threads on the screw, that engage internal threads on the casing; so that when the sleeve is given a longitudinal motion by the rotation of the screw, it is also caused to turn by the exterior threads. Said sleeve is also provided with a number of internal longitudinal key-ways which are engaged by corresponding keys or ribs on the inner end of the steering arm or shaft, which projects into the sleeve, whereby when the sleeve is given rotative and longitudinal motion it rotates the steering arm. By reason of the difference in pitch of the internal and external threads on the sleeve, the steering arm is turned more slowly than the stem but with greatly augmented power or leverage; and while the arm can be turned by turning the stem, the stem cannot be turned by any pressure exerted on the steering arm from the steering wheels, as the differential threads on the sleeve constitute a most powerful lock and the arm would break before the sleeve could be turned by it. Therefore the steering wheels connected to said arm may be readily adjusted by the steering wheel and positively held as adjusted without danger of their being casually displaced by any shock, or strain, transmitted from the steering wheels to the steering gear.

I will now describe the invention in detail, referring to the accompanying drawings for illustration of a practical embodiment thereof; and to the appended claims for summaries of the novel features and combinations of parts in which the invention resides.

In said drawings—Figure 1 represents a longitudinal sectional elevation of the complete steering gear. Fig. 2 is an enlarged transverse section on the line 2—2, Fig. 1. Fig. 3 is an enlarged transverse section on the line 3—3, Fig. 1. Fig. 4 is an enlarged transverse section on the line 4—4, Fig. 1.

The complete steering gear, as shown, comprises a handle or hand wheel 1, keyed or otherwise non-rotatably secured to a tubular stem 2, which is rotatably supported in a suitable metallic casing, as hereinafter explained. Said stem 2 has an enlarged inner end which is formed with an exterior screw thread $2^a$ that engages an internal screw thread $3^a$ in a sleeve 3 which is slidably and rotatably fitted within a cylindric part 5 of the casing; and extends below the stem. The sleeve 3 has exterior screw threads $3^b$, which are of much greater pitch than the interior threads $3^a$, and which threads $3^b$ engage corresponding internal threads or guide-waves $5^b$ in the part 5 of the casing. Said sleeve 3 is also provided in one end, below the threads $3^a$, with internal longitudinal parallel slots or key-ways $3^c$, which are engaged by corresponding ribs or keys $4^c$ on the inner end of a shaft 4 journaled in bearings in the lower end of the casing. Said shaft 4 is provided on its outer end with a preferably integral crank or steering arm $4^a$ adapted to be connected to the steering gear of the vehicle (not shown) in any suitable manner. As shown the steering arm $4^a$ is provided with a ball $4^b$ such as is customarily used to connect the steering gear with the steering wheel pitmen.

The construction is such that when the parts are properly assembled and the stem 2 is turned, but held from longitudinal movement, the screw $2^a$ will compel sleeve 3 to move longitudinally in the casing; but as the sleeve thus moves its threads $3^b$, which are of greater pitch than the threads $2^a$, will cause the sleeve to also turn, but at less rapid rate than the stem 2; and when the sleeve 3 turns it will cause shaft 4 to turn with it; and thus swing the steering arm $4^a$ right or left, according to the direction of rotation of the sleeve.

The stem 2 is shown as provided with an annular flange $2^c$ above the screw $2^a$ on opposite sides of which are placed sets of ball-bearings 6, $6^a$, which are confined in a chamber in an enlargement $5^a$ of the upper part of the casing; the ball race-ways and bearings are held in close contact with the flange $2^c$, to prevent it and the stem moving longitudinally of the casing, by means of a bushing $5^g$ which is preferably screwed into the internally threaded upper end of the casing as shown; and such upper end of the casing is preferably split and provided with opposite ears $5^e$ which may be clamped together by means of a bolt and nut, indicated at $5^f$, so that after the bushing $5^g$ is properly adjusted it can be absolutely locked in such position by tightening bolt $5^f$. The ball bearings thus prevent longitudinal play of the stem 2 in the casing and at the same time take up end thrust on the stem, in either direction, and enable it to be easily turned.

An annular bearing or washer $5^h$ may be placed in the inner end of the bushing around the stem 2.

The shaft 4 preferably has an enlargement $4^e$ by which it is journaled in an annular bearing $4^f$, of bronze or other suitable metal; which bearing is fitted in the lower end of the casing and is retained therein by means of a cap piece 7 which is screwed over and onto the lower end of the casing. This cap 7 when adjusted may be secured in position by means of a pin $7^c$ which can be engaged with one of the series of notches or apertures $7^b$ in the periphery of the cap 7 and with an eye-lug $5^i$ on the casing 5, see Fig. 1. The pin $7^c$ may be transfixed by a cotter pin $7^d$ so as to prevent casual disengagement.

The casing 5 may be provided with lateral flanges $5^m$ which may be of any suitable form and so located on the casing as will enable the steering gear to be conveniently secured in position in the vehicle in which it is to be used.

The stem 2 is preferably surrounded by a tube 9 which may be connected at its lower end to the bushing $5^g$ and at its upper end to an annular washer or bearing $9^a$ which extends into an annular recess in the under side of the hub of the steering wheel 1. This tube 9 may be utilized as a support for the upper bracket carrying the various engine controlling devices, which are indicated in the drawings, but form no part of the present invention.

On the upper end of the stem 2 is tapped a cap-nut 8 which secures the steering wheel 1 in position thereon. This cap-nut may be provided with an opening closed by a plug valve $8^a$ attached to a rod $8^b$ extending into the stem 2, and a helical spring $8^c$ is strung on the rod, between the nut 8 and a head or nut $8^d$ on the inner end of stem $8^b$, such spring normally holding the valve closed. The stem 2 is provided with an aperture $2^r$ to permit oil to pass from the stem down to the ball-bearings 6, $6^a$, and into the lower part of the casing. In order to lubricate the gear the plug $8^a$ may be lifted and the stem and casing filled with machine oil. The stem is thus used as a reservoir for the oil, and all parts are thoroughly lubricated, and as the steering gear is practically oil tight, it is rarely necessary to refill the stem.

In the practical construction of my steering gear I have deemed it advisable to form both the outer spiral and inner thread on the sleeve with such a lead that it is possible for the steering arm to produce a slight reverse rotation of the steering wheel under very severe conditions, in order to prevent too great a stress upon the link work. However, the leads are such that the driver feels no appreciable reverse or twist action of the steering wheel in his hands; and a light pressure on the steering wheel by the driver will immediately interlock the different leads and hold the steering wheels securely.

What I claim is:

1. In a steering gear, the combination of a casing; a tubular stem journaled in the casing and having exterior threads on its inner end, said tubular stem providing an oil reservoir, a valve for closing said reservoir; a sleeve in the casing having internal threads engaging the threaded stem, and having exterior threads of a greater pitch engaging corresponding threaded channels in the casing; and a steering shaft journaled in the casing and having its inner end engaging the adjacent end of the sleeve so as to partake of the rotary but not of the longitudinal movement of the sleeve.

2. In a steering gear, a casing, a stem journaled therein, having an oil reservoir, a steering wheel fitted to the upper end of said stem, a cap engaging said stem and securing the steering wheel thereto and having an opening communicating with the reservoir, and a spring controlled valve for closing said opening.

3. In a steering gear, a casing, a tubular stem journaled therein, a steering wheel fitted to the upper end of said stem, a cap engaging said stem and securing the steering wheel thereto, an opening in said cap communicating with the interior of the stem, and a spring controlled valve for closing said opening; with a sleeve in the casing having interior threads engaging threads of the stem, and exterior threads engaging corresponding channels in the casing, a steering shaft journaled in the casing adjacent the sleeve and having its inner end engaged with the sleeve so as to partake of the rotary movement of the sleeve but not of its longitudinal movement; and means for taking up end thrust on the stem.

4. In a steering gear, the combination of a casing having an enlarged upper end, and its intermediate portions interiorly threaded; a sleeve in the casing having exterior threads engaging the threads in the casing and having internal threads of less pitch than the exterior threads and having internal longitudinal key-ways; a stem entering the casing and having an enlarged inner end provided with external threads engaging internal threads of the sleeve, and an annular collar above the threads; ball bearings within the casing above and below said collar, a bushing tapped into the casing around the stem and retaining the bearings in position, and a steering shaft journaled in a bearing in the lower end of the casing and having longitudinal ribs on its inner end engaging the longitudinal key-ways in the lower end of the sleeve, and having a steering arm on its outer end.

5. In a steering gear, the combination of a casing having an enlarged upper end and its intermediate portions interiorly threaded; a sleeve in the casing having exterior threads engaging the threads of the casing and having internal threads of less pitch than the exterior threads and having longitudinal internal key-ways; a tubular stem entering the casing and having an enlarged inner end provided with external threads engaging internal threads of the sleeve, and an annular collar above the threads; ball bearings within the casing above and below said collar; a bushing tapped into the casing around the stem and retaining the bearings in position; a valve closing the tubular upper end of the stem, said tubular stem forming an oil reservoir; and a steering shaft journaled in a bearing in the lower end of the casing and having longitudinal ribs on its inner end engaging longitudinal key-ways in the sleeve, substantially as described.

In testimony that I claim the foregoing as my own, I affix my signature in presence of two witnesses.

DAVID E. ROSS.

Witnesses:
J. L. Ross,
Geo. C. Kumming.